M. P. BIXBY & F. C. REIMER.
ANTISKIDDING DEVICE.
APPLICATION FILED MAY 29, 1915.
1,169,525.
Patented Jan. 25, 1916.
2 SHEETS—SHEET 1.
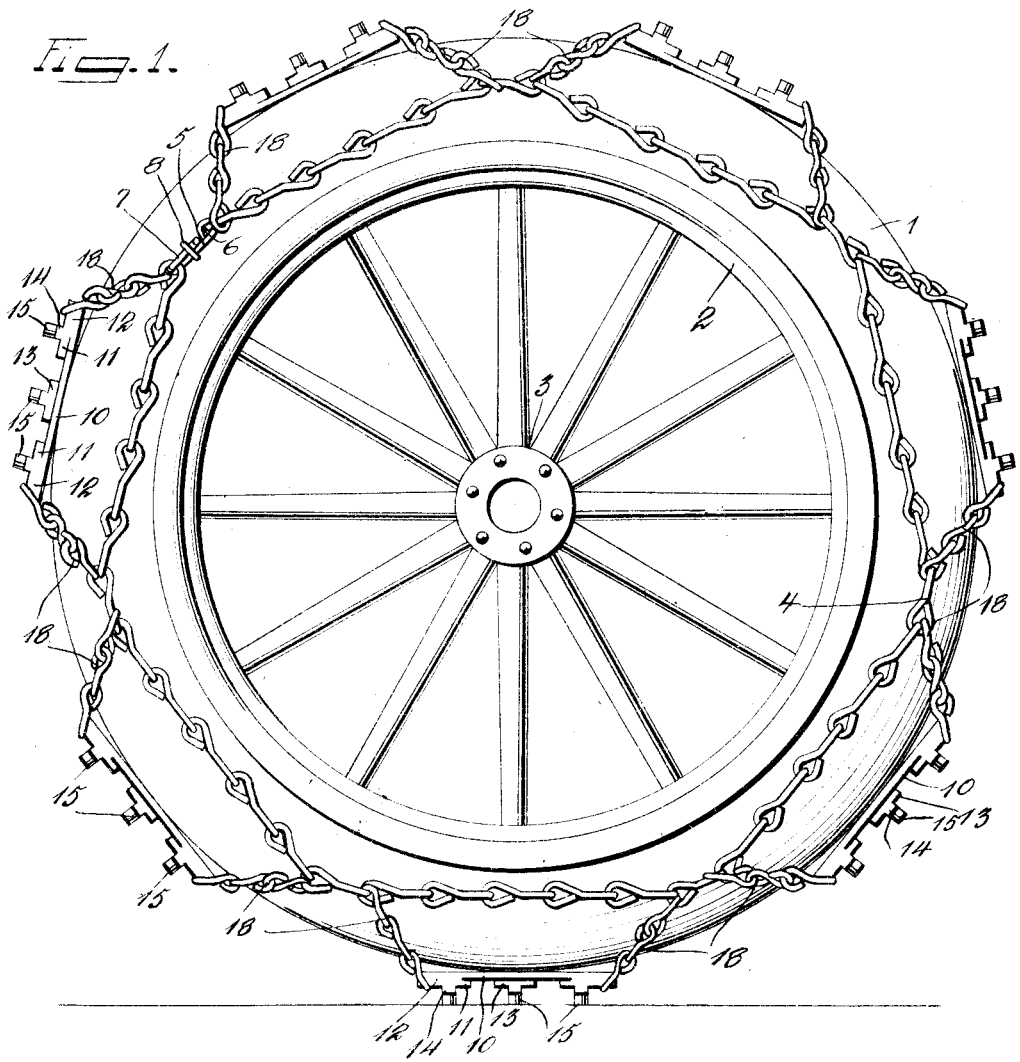
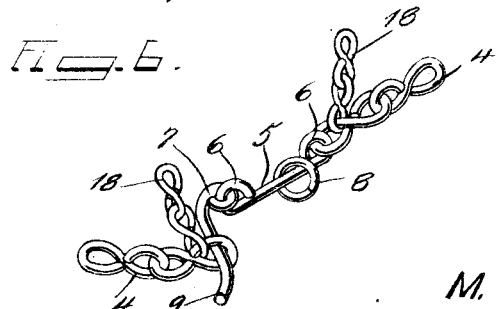
Witnesses
Inventors
M. P. Bixby.
F. C. Reimer.
By
their Attorneys

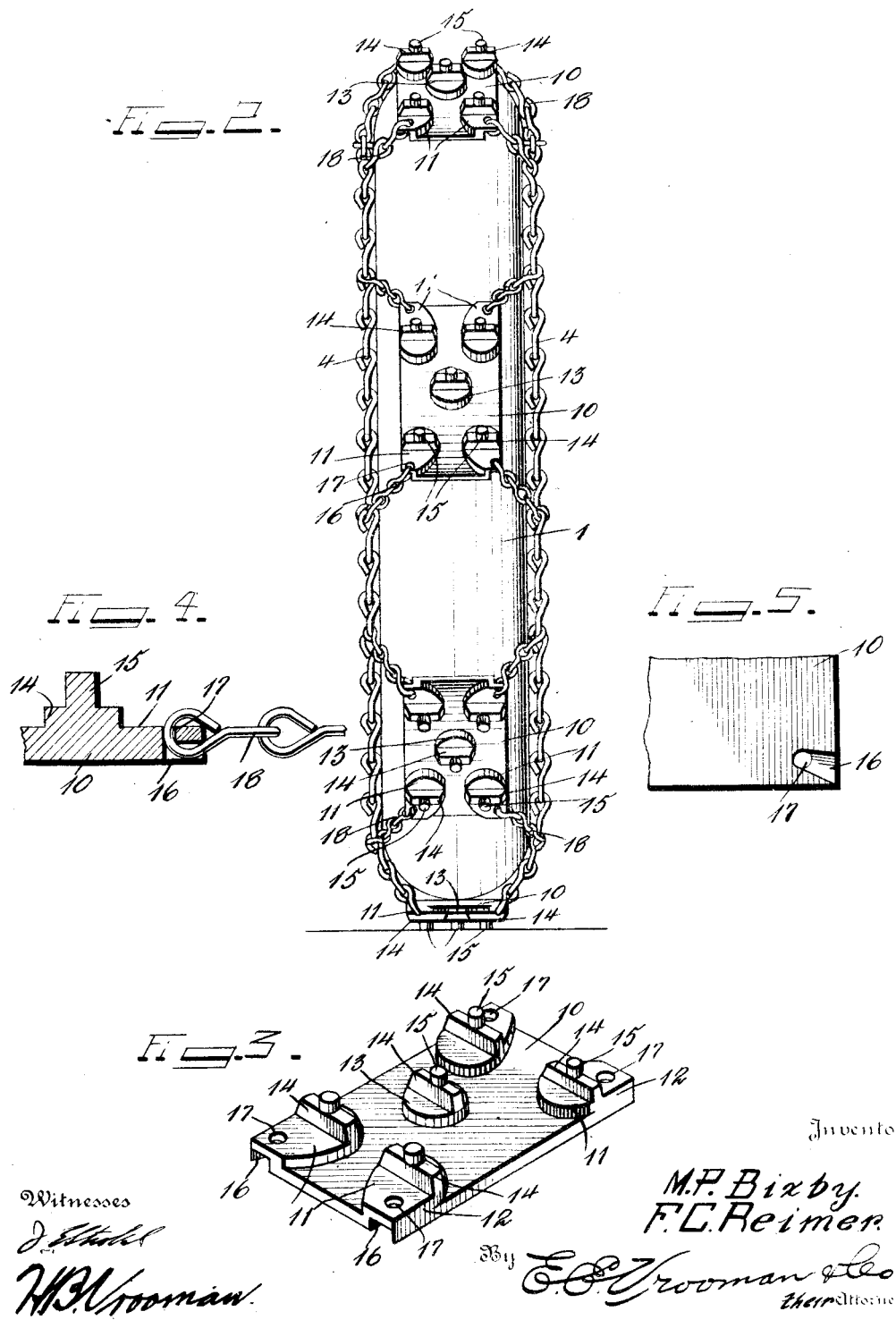

UNITED STATES PATENT OFFICE.

MILO P. BIXBY AND FRANK C. REIMER, OF GREAT FALLS, MONTANA.

ANTISKIDDING DEVICE.

1,169,525.  Specification of Letters Patent.  Patented Jan. 25, 1916.

Application filed May 29, 1915.  Serial No. 31,206.

*To all whom it may concern:*

Be it known that we, MILO P. BIXBY and FRANK C. REIMER, citizens of the United States of America, residing at Great Falls, in the county of Cascade and State of Montana, have invented certain new and useful Improvements in Antiskidding Devices, of which the following is a specification, reference being had therein to the accompanying drawing.

This invention relates to anti-skidding devices and has for its principal object the production of a device which is adapted to be detachably carried upon the tire of a wheel for the purpose of preventing the wheel from skidding or slipping when in operation.

Another object of this invention is the production of an anti-skidding device in which a plurality of plates are used for preventing the skidding or slipping of the wheel when in operation, these plates being so formed as to prevent the chains engaging the same from wearing severely upon the tire at any portion, when the same is assembled.

Another object of this invention is the production of an anti-skidding device in which the plates are provided with integral lugs of such a construction as to prevent the wheel carrying the device from skidding or slipping in mud or upon ice.

With these and other objects in view this invention consists of certain novel combinations, constructions, and arrangements of parts as will be hereinafter fully described and claimed.

In the accompanying drawings:—Figure 1 is a side elevation of the anti-skidding device, as shown carried upon a tire. Fig. 2 is an elevation of the invention, as the same appears in use. Fig. 3 is a detailed perspective view of one of the plates. Fig. 4 is a fragmentary sectional view through one end of one of the plates, illustrating the manner in which the chains engage the plates. Fig. 5 is a fragmentary plan view of one corner of one of the plates, illustrating the notches formed therein which are adapted to receive the chains. Fig. 6 is a fragmentary perspective view of the chains used in connection with this invention and particularly disclosing one of the finger locks used in connecting the free ends thereof.

Referring to the accompanying drawings by numerals it will be seen that the device is adapted to be used in connection with a tire 1 preferably pneumatic, carried upon a felly 2 of a wheel 3. As hereinbefore stated, the principal object of this invention is the production of a device which is adapted to fit upon the tire 1 for preventing the same from skidding or slipping when upon slippery surfaces.

The main side chains 4 are positioned upon each side of the tire 1 and extend entirely therearound, being positioned intermediate the distance from the felly 2 to the outer peripheries of the tire 1. Inasmuch as one chain is positioned upon each side of the tire 1, they will not wear to any considerable degree thereon when in operation which would injure the tire. In order to connect the free ends of these main side chains 4 there is provided a bar 5 used in connection with each side chain 4. Each bar 5 has an eye 6 formed at each end so as to allow one eye to be permanently secured to one end of the particular chain 4 while the finger link 7 is pivotally connected to the remaining eye of the bar as shown in Fig. 6. In order to connect the two ends of the chain, the finger link 7 is passed through the free end of the chain or the end of the chain opposite to that upon which the bar 5 is supported and is then swung so as to act as a fulcrum or draw bar or lever which will draw the free end of the chain toward the bar 5. At this time the finger link 7 will rest upon the side portions of the bar 5 whereby the ring 8 may be slipped thereover, as shown in Fig. 1 for retaining the finger link against accidental displacement. It will be noted by referring particularly to Fig. 6, that the free end of the link 7 is bent outwardly, as shown at 9, and in this manner will prevent the ring 8 from accidentally slipping thereover so as to disengage the finger link 7.

The plates used in connection with this device are similarly constructed and therefore the description of one plate will be sufficient to disclose the construction of all of the plates. Each plate comprises a rectangular flat body 10 which is provided with a plurality of integral lugs, adjacent each corner. The lug comprises an enlarged body 11 which is rounded upon its inner portions and extends evenly to the outer side edges of the plate 10 as shown at 12. At the central portion of the plate there is provided a base portion 13 upon which the rib thereof is formed. The bodies 11 and base 13 are provided with transversely extending ribs 14 from which extend the spurs 15 at their central portions. It will be seen that these ribs 14 extend transversely relative to the longitudinal axis of the plate 10 while a plurality of the ribs extend in parallel spaced relation to the remaining ribs. Inasmuch as the corner lugs have their body portions 11 thickened and extending to the outer side edges of the plate 10, sufficient space is provided for the formation of the notched portions 16 communicating with the openings 17 which extend through the bodies 11 of the plate 10. In constructing the plate as above set forth it will be seen that even inner surfaces have been provided which will fit upon the tire 1 so as to reduce undue wear upon any particular portion of the tire.

Short chains 18 are secured at spaced intervals to the main side chains 4. These short chains have their opposite ends fitting within the notches 16 and passing through the openings 17 for positively retaining the plates in their correct positions upon the tire 1. These chains, when in an assembled position, are so carried as to provide four short chains 18 for each plate, these chains diverging from each other as they extend from the plate for engaging the main side chains 4. Therefore, when the device has been assembled, it will be seen that by having these chains diverging as hereinbefore set forth, they will resist any tendency of the particular plate for having either transverse or longitudinal movement upon the tire 1.

When the device is assembled, the chains are positioned so as to cause the main side chains to pass upon either side of the tire 1. The finger links are then passed through the free ends of the side chains 4 and are then swung and locked by means of the links 8 whereby the anti-skidding device will be demountably supported upon the tire. It will be seen that the plates are of such construction as to prevent their slipping when moving upon ice since the spurs 15 will dig thereinto. The slipping of the plates is also prevented when passing upon muddy surfaces or when moving up a hill since the ribs 14 are of sufficient length to cause the same to bite into the ground and provide a comparatively broad gripping surface for holding the device from slipping. It is of course obvious that a sufficient number of these plates are provided so that at least one plate or portion thereof will engage the ground or supporting surface at all times since, when one plate is moving from engagement with the ground, the next adjacent plate will be moving into engagement therewith. It will also be seen that while the chains will positively retain the plates in engagement with the tire and against accidental displacement, the notched construction of the corner portions of the plates will provide sufficient space for the reception of the chains and therefore as the tire rotates it will not bear at any time upon the chains but will ride upon a smooth inner surface of the plates 10.

From the foregoing description, it will be seen that a very simple and efficient anti-skidding device has been produced which is so constructed as to be easily positioned upon the tire of a wheel but which is so formed as to positively prevent the skidding or slipping of the wheel when the same passes over any slippery or other surface difficult to travel over, owing to the construction of the plates.

What we claim is:—

1. In an anti-skidding device of the class described, the combination of a plurality of plates, each of said plates comprising a body having flat inner surfaces being adapted to rest upon the outer periphery of a tire, a body portion formed integral upon said plate adjacent each corner thereof, a central base formed upon said plate, transversely extending ribs formed upon said bodies and base, said ribs extending for a considerable distance beyond the outer surfaces of said plate, said ribs being adapted to hold the plate against slipping, and means for holding the plates in engagement with the outer portion of a tire.

2. In an anti-skidding device of the class described, the combination of a plurality of plates, each plate provided with a plurality of bodies formed integral thereon adjacent the corners thereof, ribs formed integral upon said bodies and extending transversely of the plate, spurs extending from the central portion of said ribs, said spurs being adapted to dig into ice or hard surfaces for holding the plate against slipping or skidding, said ribs being adapted to hold the plate against slipping, and means for holding the plates in engagement with the outer periphery of a tire whereby the plates may constitute an anti-skidding device.

3. In an anti-skidding device of the class described, the combination of a plurality of plates, each plate provided with a thickened body adjacent each corner, digging means formed upon said bodies, for digging into a supporting surface for preventing the plate from slipping, said plate provided with notches adjacent each corner, said plate also provided with a plurality of openings adjacent its corner portions communicating with the inner portions of said notches, chains fitting within said notches and passing through said openings for holding the plates upon a tire, said plates having even inner surfaces for preventing wear upon a tire, and means engaging said chains for retaining the plates in their correct positions when in use.

In testimony whereof we hereunto affix our signatures in presence of two witnesses.

MILO P. BIXBY.
FRANK C. REIMER.

Witnesses:
WILLIAM L. GOODMAN,
JOE SNELL.